United States Patent [19]

Koto

[11] 4,434,430

[45] Feb. 28, 1984

[54] INK JET PRINTER HEAD

[75] Inventor: Haruhiko Koto, Shiojiri, Japan

[73] Assignees: Epson Corporation, Nagano; Kabushiki Kaisha Suwa Seikosha, Tokyo, both of Japan

[21] Appl. No.: 383,368

[22] Filed: May 28, 1982

Related U.S. Application Data

[63] Continuation-in-part of Ser. No. 189,461, Sep. 22, 1980, Pat. No. 4,364,066.

[30] Foreign Application Priority Data

Sep. 21, 1979 [JP] Japan .............................. 54-121621

[51] Int. Cl.$^3$ ........................................ G01D 15/18

[52] U.S. Cl. ........................................ 346/140 R

[58] Field of Search ........................ 346/1.1, 75, 140

[56] References Cited

U.S. PATENT DOCUMENTS 4,216,483 8/1980 Kyser et al. ................ 346/140 PD
4,243,995 1/1981 Wright et al. ................ 346/140 PD
4,296,421 10/1981 Hara et al. .................. 346/140 PD
4,314,259 2/1982 Cairns et al. .......................... 346/75

FOREIGN PATENT DOCUMENTS 55-90375 7/1980 Japan ............................ 346/140 PD
55-118877 9/1980 Japan ............................ 346/140 PD

*Primary Examiner*—Donald A. Griffin
*Attorney, Agent, or Firm*—Blum, Kaplan, Friedman, Silberman and Beran

[57] ABSTRACT

An ink jet head for a printer for ejecting liquid ink as droplets onto a recording medium, comprises a substrate having a nozzle, pressure chamber and passageway which are defined in a surface thereof, and a vibration plate supporting thereon a piezoelectric element, the substrate and vibration plate being formed of the same or substantially the same synthetic resins. The substrate and vibratrion plate have confronting surfaces fused and bonded together by a solvent, a doped cement, or with heat and pressure, or by ultrasonic welding.

26 Claims, 10 Drawing Figures

FIG. 2
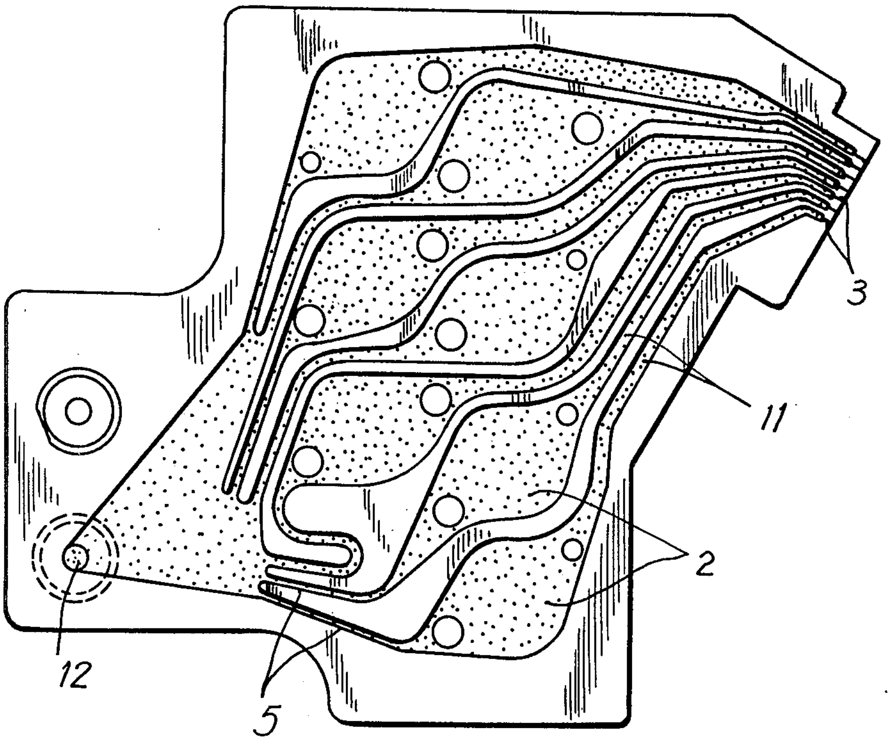
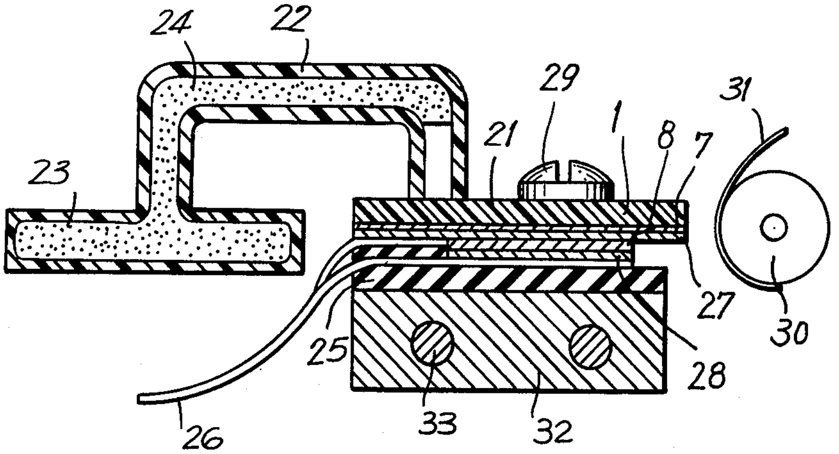
FIG. 4

FIG.6
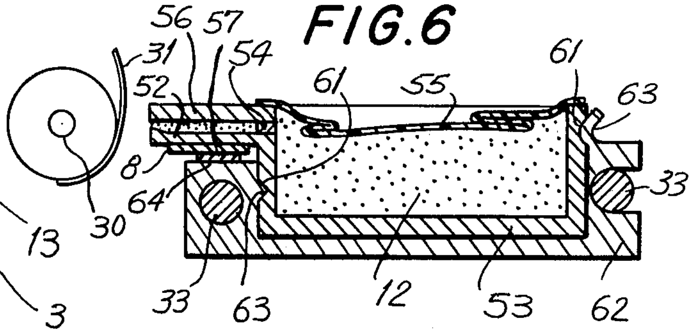
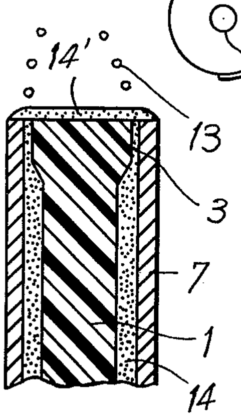
FIG.3a
FIG.7
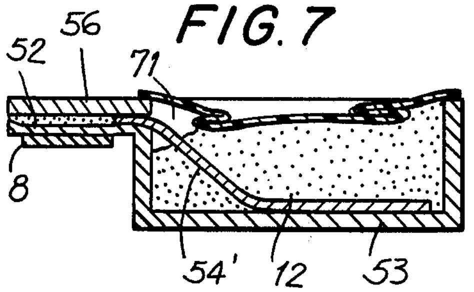
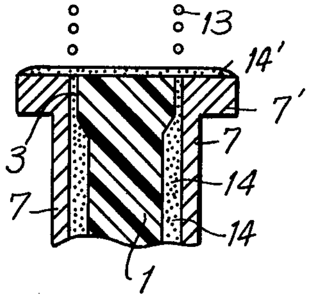
FIG.3b
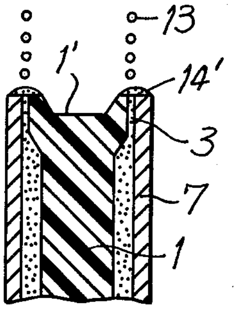
FIG.3c
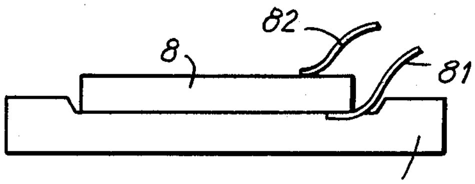
FIG.8

INK JET PRINTER HEAD

This application is a continuation-in-part of application Ser. No. 189,461, filed Sept. 22, 1980, for Ink Jet Printing Head and now U.S. Pat. No. 4,364,066, issued on Dec. 14, 1982.

BACKGROUND OF THE INVENTION

This invention relates generally to an ink jet printing head of the type used to project droplets of ink on a printing media for printing and more particularly to an ink jet printing head using a piezoelectric element to change the volume of a pressure chamber so as to eject an ink droplet from a nozzle. Ink jet heads of the ink-on-demand type have found wide use as they are simple in structure and can be equipped with multiple nozzles. Various processes for manufacturing such ink jet heads have been proposed and some of the processes have been practiced. The prior processes are however disadvantageous in that fabricated ink jet heads are costly and poor in durability. As an example, U.S. Pat. No. 4,189,734 describes manufacturing ink jet heads of photosensitive glass ceramic such as Photoceram produced by Corning Glass Corp. Ink jet heads of photosensitive glass are quite expensive to fabricate since adequate temperature control for the photosensitive glass cannot be achieved easily during the manufacturing steps. The photosensitive glass in the completed ink jet heads is opaque making it difficult to inspect the heads for the degree of bonding between a substrate and a vibration plate.

According to Swedish Patent No. 364,385 (which corresponds to U.S. Pat. No. 3,988,745), substrates of molded plastic are superimposed and fastened together by screws. Since the substrates themselves are inexpensive to fabricate and the cost of fastening them with the screws is small, the resultant ink jet heads are less costly to manufacture. For complete sealing of a pressure chamber and passageways leading to nozzles, the surfaces of each substrate should be finished to a high level of flatness, and substrates of molded plastic cannot attain the required planarity. With multi-nozzle heads having a multiplicity of nozzles, the nozzles are fixed by a small number of common screws, an arrangement which cannot completely seal all of the passageways. Those passageways which are remote from the fastening screws tend to communicate with each other as a piezoelectric element is mechanically distorted, since the substrates are not sufficiently pressed against each other at such passageways.

One expedient to eliminate the foregoing difficulty would be to bond the substrates defining passageways with an adhesive. The adhesive might however flow into and clog nozzles of a small cross-section. Also, the adhesive coated on the passageway walls would tend to come off with time under the influence of ink flowing through the passageways and block the nozzles.

Another process of manufacturing ink jet heads has been practiced which comprises the steps of narrowing the tip of a glass tube into a nozzle and covering the glass tube with a tubular piezoelectric element. With such a process, however, the tubular piezoelectric element is quite costly to fabricate. It is dimensionally difficult to put a multiplicity of nozzles in a highly compact arrangement. Furthermore, the greater is the number of nozzles to be incorporated into an ink jet head, the higher the cost of manufacture of the head becomes.

In summary, the ink jet heads heretofore proposed or put to use have been either expensive and reliable in operation or inexpensive but undependable in operation.

What is needed is an ink jet head which is inexpensive to produce as well as reliable in operation.

SUMMARY OF THE INVENTION

Generally speaking, in accordance with the invention, an ink jet printing head especially suitable for reliable printing and of simple economical construction is provided.

The ink jet head comprises a substrate having a nozzle, pressure chamber and a passageway defined in a surface of the substrate, and a vibration plate supporting thereon a piezoelectric element. Substrates and vibration plates are made of thermoplastic resins and fused and bonded together at confronting surfaces thereof by a solvent, doped cement, heat and pressure, or ultrasonic welding. With the ink jet head assembled, the passageway is completely sealed and the nozzle is not clogged with any adhesive.

Accordingly, it is an object of this invention to provide an improved ink jet printing head which is inexpensive to manufacture.

Another object of this invention is to provide an improved ink jet printing head which is reliable in operation.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a plan view, to an enlarged scale, of an alternative embodiment of an ink jet printing head in accordance with the invention;

FIGS. 3*a* to 3*c* are partial cross-sectional views to a further enlarged scale of nozzles in the ink jet printing head of FIG. 2;

FIG. 4 is a side elevational view, partly in section, of an ink jet printing head in accordance with the invention as used in a printer;

FIG. 6 is a sectional side view of an ink jet printing head in accordance with the invention incorporated in a printer;

FIG. 7 is a side section view of an alternative embodiment of an ink jet printing head in accordance with the invention; and FIG. 8 is a side elevational view of a piezoelectric element with lead wires for use in an ink jet printing head in accordance with the invention.

DESCRIPTION OF THE PREFERRED EMBODIMENTS

Figure 1:
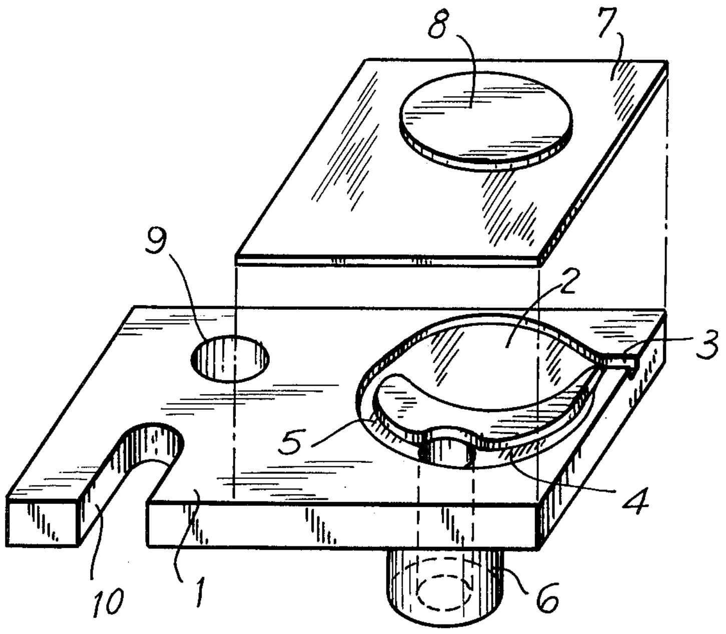
FIG. 1 is an exploded perspective view of an ink jet printing head in accordance with the invention.

With reference to FIG. 1, an ink jet printing head in accordance with the invention comprises a substrate 1, injection molded of plastic material and having a corrosion resistivity with respect to the printing ink which is used. The substrate 1 includes a pressure chamber 2, nozzle 3 and supply passages 4, 5 for supplying ink all of which are formed in the surface thereof. A supply tube 6 attaches to the substrate 1 for supplying ink from an exterior source to the supply passages 4,5. A vibration plate 7, made of the same material as that of the substrate 1, has a conductive film on the outer surface. The vibration plate 7 supports a piezoelectric element 8 having electrodes on its planar surfaces.

The substrate 1 also includes a positioning hole 9 and an attachment slot 10 which are used when the ink jet printing head is mounted to a printer.

The vibrational plate 7, substrate 1 and piezoelectric element 8 are bonded together by a solvent or doped cement which has lower viscosity than that of epoxy adhesives which have generally been used in assembling ink jet heads. Thus, the solvent or doped cement is coated on the substrate 1 or on the vibration plate 7 as a layer having a thickness of several microns. With such a construction, the nozzle 3 is not clogged with adhesive when the substrate 1 and the vibration plate 7 are bonded to each other. The possibility of the nozzle 3 being blocked with adhesive is much less when coating the surface of the substrate 1 or the vibration plate 7 with a solvent or doped cement and then leaving the substrate 1 or the vibration plate, thus coated, for a period of time to allow some of the solvent or doped cement to evaporate. Then, the substrate 1 and the vibration plate 7 are pressed against each other so as to be bonded together. As the substrate 1 or the vibration plate 7 has a surface layer of softened solvent or doped cement, surface irregularities of the substrate 1 or the vibration plate 7 become embedded in or filled by the softened layer when the surfaces are put together and pressed against each other. The result is complete sealing of the passageways.

Annealing of the bonded part permits the solvent or doped cement to completely evaporate whereby the passageway walls are free of any solvent or doped cement which might otherwise come off the walls under the influence of ink and clog the nozzle. The substrate, vibration plate and bonded layer are of the same material and are fused together, with the result that the substrate and the vibration plate cannot be separated from each other.

The substrate and vibration plate may be constructed of polyphenylene ether polysulphone polyethersulfone, and the solvent may be benzyl alcohol. The substrate may be bonded to the vibration plate by a doped cement which is prepared by doping diethylene glycol monobutyl ether acetate with ABS (acrylonitrile-butadiene-styrene). With these materials, the substrate and vibration plate are positively bonded easily without clogging the nozzle and cracks and whitening do not appear. Moreover, the solvents do not evaporate very rapidly, leaving sufficient time for efficient manufacturing operations and high productivity. The two solvents, namely, benzyl alcohol and doped cement, are respectively most preferable for bonding plates of polysulphone and ABS.

As another example, the substrate and the vibration plate may be made of polysulphone or ABS and be bonded together by a solvent, such as trichloroethylene or methylene chloride and the like. These combinations also provide secure bonding without nozzle clogging. Also, for binding the substrate and vibration plate which are made of ABS, methyl ethyl ketone or methyl isobutyl ketone may be used as a solvent. Alternatively, the substrate and vibration plate may be made of polymethyl methacrylate or polycarbonate. These may be bonded together with a solvent, such as ethylene dichloride.

By selecting transparent grades of resins, such as polysulphone, ABS, polymethyl methacrylate, and polycarbonate, bonded parts can be visually checked readily for the degree of bonding and flow of ink in order to detect trouble such as clogging of the nozzle and inclusion of air bubbles. Additional plastic materials which may be used for the substrate and vibration plate include, for example, vinyl polymers, such as polyvinyl chloride, polyvinylidene chloride, polyvinyl acetate, polyvinyl alcohol, and polystyrene, acrylonitrile-styrene copolymers (AS), or ethylenevinyl acetate copolymers.

The substrate and vibration plate formed of polysulphone, ABS, or polyethersulphone may also be plated. In this case evaportion of ink and inclusion of air can be prevented more effectively, although ink flow within the ink jet head cannot be visually observed. When polysulphone, polyethersulphone or polycarbonate are used as the material of the substrate and vibration plate, resistance to heat is increased. These materials can be plated by vacuum plating or sputtering. This results in more effective protection against ink evaporation and air inclusion.

A substrate and vibration plate formed of thermoplastic resins of a comparatively low crystallinity as described above, can thus be fused and bonded together by an optimum organic solvent to thereby seal the passageways completely without clogging the nozzle.

Polysulphone, ABS and AS materials, used as the substrate and vibration plate, permit the two components to be stably bonded with a solvent, provide good corrosion resistivity against conventional alkaline water-color ink, and can be used safely with quick drying ink of a strong alkalinity of pH 12.5. The polysulphone or ABS substrate and vibration plate can be plated to prevent evaporation of ink through the walls. Where transparent grades of these materials are utilized, the bonded portions may be readily checked visually for complete bonding. Thus, these synthetic resins are preferred materials for use in an ink jet printing head in accordance with the invention.

Whereas in the embodiment of FIG. 1, the substrate is melted at its surface layer with a solvent and bonded to the vibration plate, the substrate and vibration plate when formed of thermoplastic resin may be fused together with heat. More specifically, the substrate and vibration plate are sandwiched and pressed against each other by a jig at a temperature approximating or below the temperature whereat the material is thermally deformable. By selecting an appropriate pressure and temperature, the substrate and vibration plate can be fused together at desired regions thereof without deforming the substrate. With a such a construction, no solvent can flow into a nozzle and accordingly, clogging due to solvent is prevented.

This process, however, has a disadvantage in that a high degree of planarity or flatness is required of the substrate. Also, the substrate tends to be insufficiently bonded to the vibration plate or becomes deformed, with a collapsed nozzle, unless the temperature and pressure are controlled very precisely. Also, the substrate and vibration plate must be pressed against each other for a relatively long period of time.

The substrate and vibration plate may also be fused together by ultrasonic welding. Where the substrate and vibration plate are to be ultrasonically fused, they may be made of crystalline resins, such as for example, acetal, nylon, polyester, or polypropylene, as well as the amorphous resins as described above. Although the ultrasonic welding is successfully applicable to ink jet printing heads having nozzles of a relatively large cross-section, nozzles having relatively small cross-sections are often clogged when the substrate and vibration plate are ultrasonically fused together.

With the construction of an ink jet printing head in accordance with the invention, as described above, the substrate and vibration plate are fused and bonded together at their surface layers so that no adhesive will come off the passageway walls to clog the nozzle, and the passageways will be completely sealed one from the other. As illustrated in FIG. 1, the nozzle 3, supply passages 4, 5 are defined on the substrate 1. Hence, they are formed easily. The ink jet printing head is constructed with few parts and is assembled without requiring precise positioning of the parts.

Whereas in the embodiment of an ink jet printing head as illustrated in FIG. 1, the ink jet head includes a single nozzle and two supply passages, the invention is not limited to such a configuration of the ink jet printing head. For example, the invention is also applicable to an ink jet printing head as illustrated in FIG. 2. Therein, the ink jet printing head comprises a plurality of pressure chambers 2, a plurality of nozzles 3, a plurality of supply passages 5 and a plurality of flow passages 11 extending from the pressure chambers 2 to the nozzles 3, respectively. With the plurality of nozzles 3, the flow passages 11 are relatively long and produce an increased impedance to the flow of ink therethrough. As a result, ink is improperly ejected at times. To avoid such a problem, the pressure chambers 2 and the flow passages 11 are formed to a relatively large depth. As an example, where the nozzles 3 are 50 microns deep, the pressure chambers 2 and flow passages 11 are 200 microns deep. The pressure chambers 2, flow passages 11 and nozzles 3 can readily be formed at such different depths in the ink jet printing head by injection-molded plastics.

It is possible to etch a substrate of photosensitive glass to form passageways of different depths. However, an increased number of manufacturing steps are required and the resulting ink jet printing heads are costly. Ink jet printing heads injection molded of plastics, however, have better ink ejection characteristics without an increase in the cost of manufacture. The ink jet head of FIG. 2 has an ink supply portion 12 which can be supplied with ink from an ink tank (not shown), the ink supply portion being injection molded simultaneously with the molding of the substrate.

FIGS. 3*a*–3*c*, illustrate portions of ink jet printing heads each having twelve nozzles and passageways defined on each of the opposite surfaces of a substrate 1. There is a total of 24 nozzles in each head. As shown in FIG. 3*a*, each vibration plate 7 is relatively thin along its entire length, allowing a portion 14′ of ink 14 which was ejected, to collect on a front face of the ink jet printing head. The collected mass 14′ of ink causes ink droplets 13, as ejected, to be directed inwardly toward each other. However, it is not desirable from the standpoint of quality of the printed characters for the ink droplets 13 to travel in various directions. Misdirection of droplets results from the degree of wetting with ink of the front face of the ink jet head.

Further, the thickness of the vibration plate 7 cannot be increased greatly as there is an optimum thickness governed by a piezoelectric element and other parts operating in conjunction with the vibration plate.

Where the vibration plate 7 have thicker portions 7′ at the front face of the ink jet head as illustrated in FIG. 3*b*, the mass 14′ of ink collected on the front face provides surface which extends at a right angle to the axis of the nozzles 3 regardless of the degree of wetting of the front face with ink. This arrangement, produced because the nozzles 3 are sufficiently far from the edge of the vibration plate, permits the droplets 13 to pass through the ink layer 14′ perpendicular to the surface of the ink layer. Thus, ink droplets 13 travel in the direction parallel to the axes of nozzles 3.

As illustrated in FIG. 3*c*, the substrate 1 may have a groove 1′ between the rows of nozzles 3, dimensioned such that each of the projecting front faces of the ink jet printing head is wetted with a mass 14′ of ink which is symmetrically shaped with respect to the axis of the nozzle 3. As a result, the ink droplets 13 travel along straight paths which are projections of the axes of the nozzles 3. As described above, ink jet printing heads of injection molded plastic may have substrates and vibration plates shaped for desirable paths of travel of ink droplets without any additional increase in the cost of manufacture.

FIG. 4 illustrates a printer which incorporates an ink jet printing head 21 which is of a construction as illustrated in FIG. 1. The printer comprises a tube 22 of polyvinyl chloride, an ink tank 23 of polyvinylidene chloride or polyethylene for containing ink 24, a body 25 of rubber, a flexible circuit base plate 26, piezoelectric element electrodes 27, 28, attachment screw 29, paper feed roller 30, recording paper 31, carriage 32 and guide shafts 33. The electrodes 27, 28 are on the opposite surfaces of the piezoelectric element 8.

In operation, the carriage 32 is driven by a drive mechanism (not shown) to move reciprocatingly along the guide shafts 33 in a direction normal to the sheet of the drawing of FIG. 4. The recording paper 31 is fed intermittently by the paper feed roller 30 in synchronization with this reciprocating movement of the carriage 32 in increments corresponding to one dot each. control circuit (not shown) produces an ink ejection signal that corresponds to the position of the carriage 32. These ink ejection signals are applied through the flexible base plate 26 to the electrodes 27, 28 to enable ink to be ejected onto the recording paper 31 by energization of the piezoelectric element in the known manner. Thus, combined movement of the carriage 32 and the paper feed roller 30 causes the printing paper to be scanned transversely and printed with ink droplets which form dots.

When ink in the ink tank 23 is consumed, the screw 29 is removed, and the entire assembly of the ink jet printing head 21, ink tank 23 and tube 22 is replaced with a new assembly. With such an arrangement, air is not introduced into the ink because the ink jet printing head 21 and ink tank 23 are coupled together and the assembly can easily be replaced when the nozzles become clogged with solidified ink. The ink jet printing head 21 in an alternative embodiment may be secured to the carriage 32 by a spring rather than the screw 29.

Figure 5:
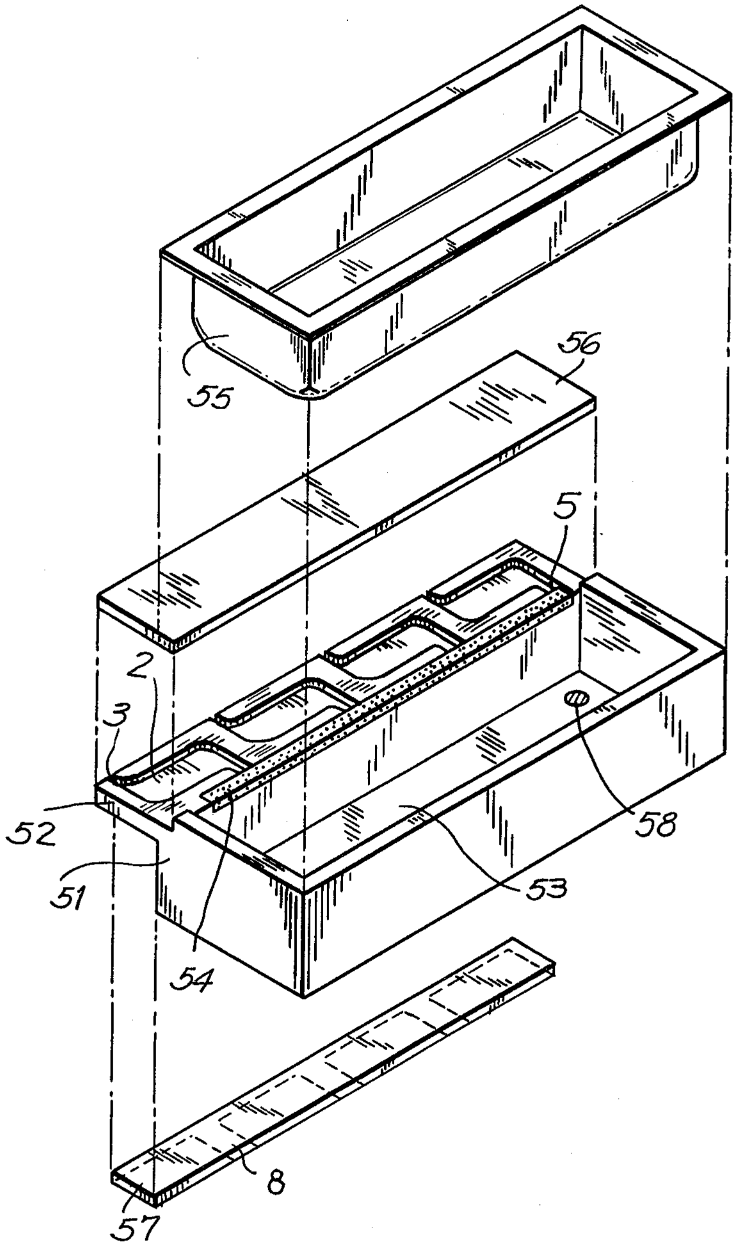
FIG. 5 is view similar to FIG. 1 of an alternative embodiment of an ink jet printing head in accordance with the invention.

FIG. 5 illustrates an alternative embodiment of an ink jet printing head in accordance with the invention comprising a substrate 51 including a head 52 having pressure chambers 2, nozzles 3, supply passages 5 and an ink tank 53 formed therein. The head 52 and ink tank 53 are integrally ejection molded. A filter 54 of porous molded plastic mounts on the substrate 51 and is disposed between the supply passages 5 and the ink tank 53. An ink bag 55 is vacuum-molded of laminated films of saponified ethylenevinyl acetate copolymer and polyethylene to prevent ink evaporation and air inclusion, that is, air infiltration for example, by diffusion.

In assembly, the filter 54 is placed on the substrate 51, and a plate 56 is bonded to the head 52 with a solvent. The ink bag 55 is positioned in the ink tank 53 and the heat sealed to the substrate around its periphery. A piezoelectric element 8 is attached to the bottom of the head 52. In FIG. 5, the piezoelectric element 8 is held against the substrate 51 so as to also serve as the vibration plate. The piezoelectric element is shared by all of the pressure chambers 2 and has electrodes 57 (broken lines) located in corresponding relationship to the pressure chambers 2, respectively. Ink is introduced into the tank 53 through an ink supply hole 58 and then the ink supply hole 58 is heat sealed.

FIG. 6 illustrates the ink jet printing head of FIG. 5 as incorporated in a printer. The ink jet printing head is secured in position by fitting a projection 63 of a carriage 62 in a recess 61 in the tank 53. With the ink jet printing head mouned on the carriage 62, the electrodes 57 and a common electrode (not shown) are pressed against a connector electrode 64 on the carriage 62 for electrical connection therewith. In operation, the carriage 62 travels along shafts 33 for printing operations, the stroke of movement of the carriage 62 being approximately ¼ of that of the carriage 32 illustrated in FIG. 4, because there are four nozzles 3 in the construction of FIGS. 5, 7 as compared to one nozzle in the construction of FIG. 4.

Because the tank 53 is rigid, the ink jet printing head in FIG. 5 can be readily manipulated as it is attached to the carriage 62. When the nozzles 3 are clogged or air is trapped in the head, the ink bag 55 may be depressed with the fingers to remove any ink which blocks the nozzles 3 or to force trapped air out of the head. The ink bag 55 may be inflated in advance so that negative pressure develops in the bag 55 as ink is consumed. Thereby, ink is prevented from flowing out of the nozzles 3, due to the forces of gravity.

The ink jet printing head 52 and ink tank 53 illustrated in FIGS. 5, 6 are integrally injection molded. Hence, an ink jet printer incorporating such an ink jet printing head and ink tank is constructed with a minimum number of parts and is reliable in operation and can be handled without difficulty.

Whereas in the embodiment of FIG. 5, the pressure chambers 2 and the nozzles 3 are formed in the substrate 51 in an alternative embodiment in accordance with the invention, the pressure chambers and nozzles may be formed in the plate 56. The filter 54 may be integrally injection molded at the same time that the nozzles 3 and other components are formed. The ink bag 55 may comprise, for example, a film of polyvinylidene chloride, a film on which aluminum is vapor-deposited, or a film of laminated aluminum foil. With these materials, however, some air may enter through the ink bag 55. Where the filter 54 is formed of polyvinyl formal, which has better wettability with respect to ink, the filter 54 serves as an air trap which prevents air introduced in the ink tank 53 from flowing into the head 52.

In an alternative embodiment as illustrated in FIG. 7, a wider filter 54′ extends into the ink tank 53 to supply ink to the print head by capillary attraction without being adversely affected by an air pocket 71 formed in the tank 53 adjacent to the head.

In an ink jet printing head, in accordance with the invention, the piezoelectric element and vibration plate may be bonded with an epoxy adhesive, or the former may be embedded into the latter while being heated. The conductive film may be deposited on the vibration plate as by plating, vacuum evaporation or sputtering, or may comprise a metal foil bonded to the vibration plate. The conductive film on the vibration plate may be omitted and, as illustrated on FIG. 8, lead wires 81, 82 are soldered to opposite surfaces of the piezoelectric element 8 which is then bonded to the vibration plate 7.

As described above, a substrate of synthetic resin in accordance with the invention is fused to the vibration plate without use of any adhesive. As a result passageways can be completely sealed by the injection molded substrate having a rough surface, and nozzles are not clogged. The ink jet printing head of the present invention is constructed of a small number of parts and accordingly, can be fabricated with less cost. When the ink jet printing head is formed of transparent plastic, bonded portions in the head can be readily checked visually, resulting in a reduced number of steps required for an inspection process.

With the ink jet printing head being available at a lower cost, the ink jet printing head can be replaced with a new one simultaneously with replacement of the ink tank. Thus, the ink jet printing head is reliable in operation as it is free of trapped air in the ink which otherwise would be introduced if only the ink tank is replaced.

Whereas in the illustrated embodiments, the ink jet printing heads are injection molded, an ink jet printing head may also be formed by hot pressing. The substrate and vibration plate may be fabricated of materials of high compatability such as ABS and AS resins. Because synthetic resins generally have a small Young's modulus, the piezoelectric element is subjected to small flexures in a direction normal to its plane due to diametrical displacements of the piezoelectric element. To improve this property, the vibration plate and substrate may be formed of a material having a large modulus of elasticity such as glass fiber. Furthermore, the piezoelectric element may be made of a high molecular piezoelectric material which can double as the vibration plate.

As described above, in accordance with the invention, a pressure chamber, nozzle, passageways, supply tube, etc., are formed integrally by injection molding so that the number of individual parts is decreased. Problems such as rusting as occurs in a metal head due to action of the ink do not occur in the ink jet printing head in accordance with the invention and assembly is easy. Furthermore, when ink in an ink tank is used up or the head breaks down, if the ink tank and the head are exchanged with new components at the same time, air never enters into the ink and reliable printing is accomplished.

The principles of the present invention may be incorporated in ink jet printing heads other than those of the ink-on-demand type. The ink jet printing head in accordance with the invention can be used in various types of printers, plotters, facsimile equipment and copying machines.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An ink jet printer head for a printer for ejecting ink onto a recording medium, comprising thermoplastic resin comprising:

a first substrate having a substantially planar surface and a second substrate having a cooperating substantially planar surface, one of the planar surfaces having at least one nozzle, pressure chamber and passageway defined therein;

a piezoelectric element bonded to one of the first and second substrates, said first and second substrates formed from a thermoplastic material with the substantially planar surfaces permanently coupled together for forming the at least one nozzle, pressure chamber and passageway; and an ink tank which is integrally formed with said substrate defining said nozzle, pressure chamber and passageway.

2. An ink jet printer head as claimed in claim 1, wherein said first and second substrates are formed of a crystalline plastic resin.

3. An ink jet printer head as claimed in claim 2, wherein the crystalline plastic resin is selected from the group consisting of acetals, nylons, polyester or polypropylene.

4. An ink jet printer head as claimed in claim 1, wherein said ink tank has an opening to the exterior of said tank.

5. An ink jet printer head as claimed in claim 4, and further comprising a flexible film bonded to said ink tank, said film closing said opening.

6. An ink jet printer head for a printer for ejecting liquid ink onto a recording medium, comprising:

a first substrate having a substantially planar surface and a second substrate having a cooperating substantially planar surface, the planar surfaces cooperating to define at least one nozzle, pressure chamber and passageway therebetween; and a piezoelectric element bonded to one of the first and second substrates, said first and second substrates formed from a thermoplastic material with the cooperating substantially planar surfaces permanently coupled together for forming the at least one nozzle, pressure chamber and passageway.

7. An ink jet printer head as claimed in claim 6, wherein said first and second substrates are formed of amorphous plastic resin.

8. An ink jet printer head as claimed in claim 7, wherein the amorphous plastic resin is selected from the group consisting of polyphenylene ether polysulphones polyethersulfone, ABS resins, polymethyl methacrylate polycarbonates, polyvinyl resins, polystyrene, acrylonitrile-styrene copolymers or ethylene vinylacetate copolymers.

9. An ink jet printer head as claimed in claim 8, wherein said confronting surfaces of said first and second substrates are fused by a solvent of benzyl alcohol.

10. An ink jet printer head as claimed in claim 7, wherein said first and second substrates are formed of polysulphone.

11. The ink jet printer head of claim 10, wherein said substantially planar surfaces of the first and second substrates are permanently coupled by a doped cement.

12. The ink jet printer head of claim 11, wherein the doped cement is diethylene glycol monobutyl ether acetate doped with acrylonitrile-butadiene-styrene resin.

13. The ink jet printer head of claim 10, wherein the substantially planar surfaces of the first and second substrates are permanently coupled by bonding with an organic solvent.

14. The ink jet printer head of claim 13, wherein the solvent is selected from the group consisting of trichloroethylene, methylene chloride and benzyl alcohol.

15. An ink jet printer head as claimed in claim 7, wherein said first and second substrates are formed of ABS.

16. An ink jet printer head as claimed in claim 15, wherein said facing surfaces of said first and second subsrates are bonded together by a doped cement, said doped cement being a product of doping diethylene glycol monobutyl ether acetate with ABS.

17. An ink jet printer head as claimed in claim 7, wherein said first and second substrates are formed of thermoplastic resins and fused together by an organic solvent suitable for bonding said thermoplastic resin.

18. An ink jet printer head as claimed in claim 6, and further comprising an ink tank, said tank and one of the substrates of said head being formed integrally and simultaneously replaceable in said printer.

19. The ink jet printer head of claim 6, wherein the substantially planar surfaces of the first and second substrates are permanently coupled by bonding with an organic solvent.

20. The ink jet printer head of claim 6, wherein the substantially planar surfaces of the first and second substrate are permanently coupled by bonding with a doped cement.

21. The ink jet printer head of claim 6, wherein the substantially planar surfaces of the first and second substrate are permanently coupled by fusing with heat.

22. An ink jet printer head as claimed in claim 6, wherein said first and second substrates are bonded together under pressure at an elevated temperature, said temperature being below the temperature at which said substrates are deformable.

23. The ink jet printer head of claim 6, wherein the substantially planar cooperating surfaces of the first and second substrate are permanently coupled by fusing with ultrasonic welding.

24. The ink jet printer head of claim 6, wherein the thermoplastic resin is transparent.

25. An ink jet printer head for a printer for ejecting liquid ink onto a recording medium, comprising:

a first substrate having a substantially planar surface and a second substrate having a cooperating substantially planar surface, one of the planar surfaces having at least one nozzle, pressure chamber and passageway defined therein, and a piezoelectric element bonded to one of the first and second substrates, said first and second substrates formed from a polysolfone resin with the cooperating substantially planar surfaces permanently coupled together by bonding with a doped cement for forming the at least one nozzle, pressure chamber and passageway.

26. The ink jet printer head of claim 25, wherein the doped cement is diethylene glycol monobutyl ether acetate doped with an acrylonile-butadiene-styrene resin.

* * * * *